Figure 1:
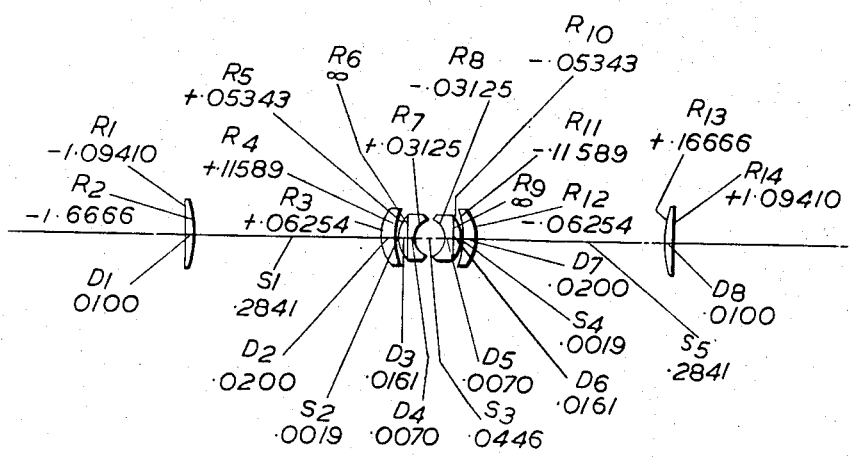

May 22, 1956  K. R. COLEMAN  2,746,349
PROJECTION OPTICAL OBJECTIVES
Filed May 26, 1952

Inventor
KENNETH ROY COLEMAN
By Emery Holcombe & Blair
Attorney

United States Patent Office 2,746,349
Patented May 22, 1956

2,746,349
PROJECTION OPTICAL OBJECTIVES

Kenneth Roy Coleman, Leicester, England, assignor to Taylor, Taylor & Hobson Limited, Leicester, England, a British company Application May 26, 1952, Serial No. 289,965

Claims priority, application Great Britain May 31, 1951

20 Claims. (Cl. 88—57)

This invention relates to an optical objective corrected for spherical and chromatic aberrations, coma, astigmatism, field curvature and distortion, and intended more especially for projection copying purposes, usually at 1:1 magnification. The objective according to the invention is particularly suitable for use in apparatus for the precision measurement of section profiles.

The present invention has for its object to provide an objective suitable for such purposes, having telecentric properties (that is such that the principal rays are collimated in the object and image spaces) and well-corrected for a relatively high aperture with good correction for oblique spherical aberration.

The objective according to the invention comprises two compound meniscus divergent components having their air-exposed surfaces concave to a diaphragm between them and located between two simple convergent components, and two convergent field lenses which embrace such components between them and are so arranged as to render the objective telecentric, such field lenses contributing towards the correction of the aberrations of the objective and each having an equivalent focal length between .20 and .80 times the track length of the objective, the axial separation between the divergent meniscus components lying between .03 and .06 times such track length. The term "track length" is herein used to refer to the distance between the axial image point and the axial object point of the objective.

The objective is preferably symmetrical about the diaphragm but some slight divergence from true symmetry is permissible provided that no dimension in either half differs from the corresponding dimension in the other half by more than 15 per cent. The field lenses are conveniently of simple meniscus form with their surfaces convex towards the central diaphragm.

The equivalent focal length of either half of the central group (comprising the middle four components) of the objective preferably lies between .25 and .90 times the track length of the objective. The radius of curvature of the inner air-exposed surface of each compound divergent component conveniently lies between .025 and .050 times the track length and that of the outer air-exposed surface of such component between .047 and .100 times such track length. The equivalent focal length of each of the simple convergent components of the central group preferably lies between .15 and .50 times such track length.

Conveniently, each compound divergent component comprises an inner divergent element cemented to an outer convergent element, whose mean refractive index exceeds that of the divergent element by more than .05 and whose Abbé V number exceeds that of the divergent element by between 14 and 22.

Figure 2:
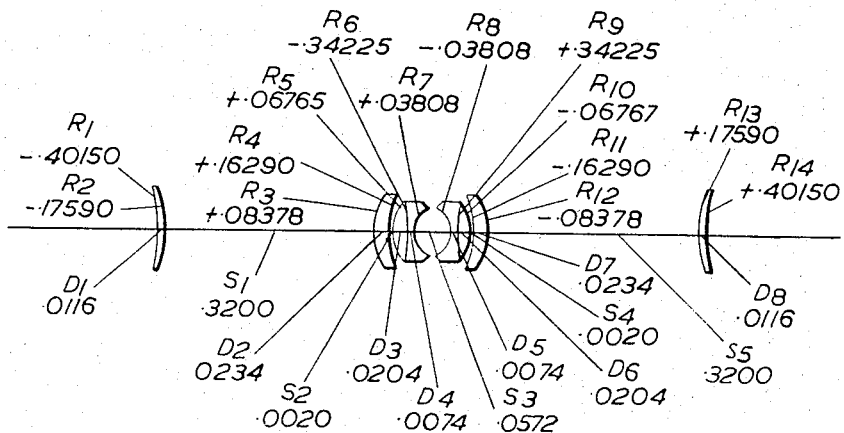

Figures 1 and 2 of the accompanying drawings respectively illustrate two convenient practical examples of objective according to the invention.

Numerical data for these examples are given in the following tables, in which $R_1$, $R_2$ ... represent the radii of curvature of the individual surfaces of the objective, the positive sign indicating that the surface is convex towards the front and the negative sign that it is concave thereto, $D_1$, $D_2$ ... represent the axial thicknesses of the various elements, and $S_1$, $S_2$ ... represent the axial air separations between the components. The tables also give the mean refractive indices $n_D$ for the D-line of the spectrum and the Abbé V numbers of the materials used for the individual elements. The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Track length 1.000    Relative aperture F/4 at each end]

| Radius | Thickness or Air Separation | Refractive Index $n_D$ | Abbé V Number |
|---|---|---|---|
| $R_1 = -1.09410$ | $D_1 = .0100$ | 1.515 | 56.4 |
| $R_2 = - .16666$ | $S_1 = .2841$ | | |
| $R_3 = + .06254$ | $D_2 = .0200$ | 1.515 | 56.4 |
| $R_4 = + .11589$ | $S_2 = .0019$ | | |
| $R_5 = + .05343$ | $D_3 = .0161$ | 1.651 | 58.6 |
| $R_6 = \infty$ | $D_4 = .0070$ | 1.579 | 41.1 |
| $R_7 = + .03125$ | $S_3 = .0446$ | | |
| $R_8 = - .03125$ | $D_5 = .0070$ | 1.579 | 41.1 |
| $R_9 = \infty$ | $D_6 = .0161$ | 1.651 | 58.6 |
| $R_{10} = - .05343$ | $S_4 = .0019$ | | |
| $R_{11} = - .11589$ | $D_7 = .0200$ | 1.515 | 56.4 |
| $R_{12} = - .06254$ | $S_5 = .2841$ | | |
| $R_{13} = + .16666$ | $D_8 = .0100$ | 1.515 | 56.4 |
| $R_{14} = +1.09410$ | | | |

Example II

[Track length 1.000    Relative Aperture F/4 at each end]

| Radius | Thickness or Air Separation | Refractive Index $n_D$ | Abbé V Number |
|---|---|---|---|
| $R_1 = -.40150$ | $D_1 = .0116$ | 1.691 | 54.8 |
| $R_2 = -.17590$ | $S_1 = .3200$ | | |
| $R_3 = +.08378$ | $D_2 = .0234$ | 1.691 | 54.8 |
| $R_4 = +.16290$ | $S_2 = .0020$ | | |
| $R_5 = +.06765$ | $D_3 = .0204$ | 1.651 | 58.6 |
| $R_7 = -.34225$ | $D_4 = .0074$ | 1.579 | 41.1 |
| $R_7 = +.03808$ | $S_3 = .0572$ | | |
| $R_8 = -.03808$ | $D_5 = .0074$ | 1.579 | 41.1 |
| $R_9 = +.34225$ | $D_6 = .0204$ | 1.651 | 58.6 |
| $R_{10} = -.06767$ | $S_4 = .0020$ | | |
| $R_{11} = -.16290$ | $D_7 = .0234$ | 1.691 | 54.8 |
| $R_{12} = -.08378$ | $S_5 = .3200$ | | |
| $R_{13} = +.17590$ | $D_8 = .0116$ | 1.691 | 54.8 |
| $R_{14} = +.40150$ | | | |

These two examples are both symmetrical, the diaphragm being midway between the surfaces $R_7$ and $R_8$, and the axial distance from the front surface of the objective to the front focal point and the axial distance from the rear surface of the objective to the rear focal point are each .1403 in Example I and .08669 in Example II times the track length of the objective.

In each half of the objective in Example I, the equivalent focal length of the field lens is .379, that of the remainder of the half objective (i. e. that of half the central group) is .367, and that of the simple convergent component between the field lens and the doublet is .262, in each case in terms of the track length of the objective. The corresponding figures for Example II are respectively .454, .321 and .250.

Each divergent doublet has an outer convergent element and an inner divergent element, and the material of the convergent element has higher mean refractive index and higher Abbé V number than that of the divergent element, the index difference being .072 and the V number difference 17.5, in both examples.

In both examples, the field lenses are so located as to give the desired telecentric feature and they also provide a considerable amount of overcorrect astigmatism, thereby permitting the central separation to be increased to a value of 1.5 times the radius of curvature of either of the innermost surfaces of the objective, in order to improve the oblique spherical aberration correction, to which again the field lenses contribute. In both examples, the objective has a relatively wide aperture equivalent to about f/4, and is well-corrected for spherical aberrations, astigmatism, field curvature and axial colour, other aberrations of course being absent owing to the symmetry of the objective.

Whilst it will usually be satisfactory to make the field lenses in the form of simple elements, it may sometimes be convenient to employ compound field lenses.

What I claim as my invention and desire to secure by Letters Patent is:

1. An optical objective, corrected for spherical and chromatic aberrations, coma, astigmatism, field curvature and distortion, and comprising a central group of four components consisting of two simple convergent outer components and two compound meniscus divergent inner components, such divergent components having their air-exposed surfaces concave towards a diaphragm position between them and being separated from one another by an axial distance between .03 L and .06 L where L is the track length of the objective (that is, the distance between the axial object point and the axial image point of the objective), and two convergent field lenses embracing the central group between them and arranged to render the objective telecentric, such field lenses contributing to the correction of the aberrations of the objective and each having equivalent focal length between .20 L and .80 L.

2. An optical objective as claimed in claim 1, in which each field lens is simple and of meniscus form with its surfaces convex towards the central group.

3. An optical objective as claimed in claim 2, in which the radii of curvature of the inner and outer air-exposed surfaces of each compound divergent component lie respectively between .025 L and .050 L and between .047 L and .100 L.

4. An optical objective as claimed in claim 3, in which the equivalent focal length of each of the simple convergent components of the central group lies between .15 L and .50 L.

5. An optical objective as claimed in claim 4, in which each compound divergent component consists of an inner divergent element cemented to an outer convergent element made of a material whose mean refractive index exceeds that of the divergent element by more than .05 and whose Abbé V number exceeds that of the divergent element by between 14 and 22.

6. An optical objective as claimed in claim 1, in which the radii of curvature of the inner and outer air-exposed surfaces of each compound divergent component lie respectively between .025 L and .050 L and between .047 L and .100 L.

7. An optical objective as claimed in claim 1, in which the equivalent focal length of each of the simple convergent components of the central group lies between .15 L and .50 L.

8. An optical objective as claimed in claim 1, in which each compound divergent component consists of an inner divergent element cemented to an outer convergent element made of a material whose mean refractive index exceeds that of the divergent element by more than .05 and whose Abbé V number exceeds that of the divergent element by between 14 and 22.

9. An optical objective, corrected for spherical and chromatic aberrations, coma, astigmatism, field curvature and distortion, and comprising a central group of four components consisting of two simple convergent outer components and two compound meniscus divergent inner components, such divergent components having their air-exposed surfaces concave towards a diaphragm position between them and being separated from one another by an axial distance between .03 L and .06 L where L is the track length of the objective, (that is, the distance between the axial object point and the axial image point of the objective) and two convergent field lenses embracing the central group between them and arranged to render the objective telecentric, such field lenses contributing to the correction of the aberrations of the objective and each having equivalent focal length between .20 L and .80 L, and such objective being at least approximately symmetrical about the diaphragm position, the permissible divergence from true symmetry being such that no dimension in one half of the objective differs from the corresponding dimension in the other half of the objective by more than 15 per cent.

10. An optical objective as claimed in claim 9, in which each field lens is simple and of meniscus form with its surfaces convex towards the central group.

11. An optical objective as claimed in claim 10, in which the equivalent focal length of each half of the central group lies between .25 L and .90 L.

12. An optical objective as claimed in claim 9, in which the equivalent focal length of each half of the central group lies between .25 L and .90 L.

13. An optical objective as claimed in claim 9, in which the radii of curvature of the inner and outer air-exposed surfaces of each compound divergent component lie respectively between .025 L and .050 L and between .047 L and .100 L, and the equivalent focal length of each of the simple components in the central group lies between .15 L and .50 L.

14. An optical objective as claimed in claim 9, in which each compound divergent component consists of an inner divergent element cemented to an outer convergent element made of a material whose mean refractive index exceeds that of the divergent element by more than .05 and whose Abbé V number exceeds that of the divergent element by between 14 and 22.

15. An optical objective, corrected for spherical and chromatic aberrations, coma, astigmatism, field curvature and distortion, and comprising a central group of four components consisting of two simple convergent outer components and two compound meniscus divergent inner components, such divergent components having their air-exposed surfaces concave towards a diaphragm position between them and being separated from one another by an axial distance between .03 L and .06 L where L is the track length of the objective, (that is, the distance between the axial object point and the axial image point of the objective) and two convergent field lenses embracing the central group between them and arranged to render the objective telecentric, such field lenses contributing to the correction of the aberrations of the objective and each having equivalent focal length between .20 L and .80 L, the equivalent focal length of each half of the central group lying between .25 L and .90 L.

16. An optical objective as claimed in claim 15, in which each field lens is simple and of meniscus form with its surfaces convex towards the central group.

17. An optical objective as claimed in claim 16, in which the radii of curvature of the inner and outer air-exposed surfaces of each compound divergent component lie respectively between .025 L and .050 L and between .047 L and .100 L.

18. An optical objective as claimed in claim 15, in which each compound divergent component consists of an inner divergent element cemented to an outer convergent element made of a material whose mean refractive index exceeds that of the divergent element by more than .05 and whose Abbé V number exceeds that of the divergent element by between 14 and 22.

19. An optical objective as claimed in claim 15, in which the radii of curvature of the inner and outer air-exposed surfaces of each compound divergent component lie respectively between .025 L and .050 L and between .047 L and .100 L, and the equivalent focal length of each of the simple components in the central group lies between .15 L and .50 L.

20. An optical objective as claimed in claim 15, in which the equivalent focal length of each of the simple convergent components of the central group lies between .15 L and .50 L.

References Cited in the file of this patent

UNITED STATES PATENTS

| | | |
|---|---|---|
| 583,336 | Rudolph | May 25, 1897 |
| 1,945,977 | Oswald | Feb. 6, 1934 |
| 2,256,102 | Reason | Sept. 16, 1941 |
| 2,354,614 | Reason | July 25, 1944 |
| 2,430,549 | Altman | Nov. 11, 1947 |
| 2,481,639 | Altman et al. | Sept. 13, 1949 |

FOREIGN PATENTS

| | | |
|---|---|---|
| 157,040 | Great Britain | Jan. 20, 1921 |
| 608,583 | Great Britain | Sept. 17, 1948 |